Patented July 24, 1962

3,046,314
1-ARYL-2,2-DIHALOCYCLOPROPANES
Ellis K. Fields and Joseph M. Sandri, Chicago, Ill., assignors to Standard Oil Company, Chicago, Ill., a corporation of Indiana
No Drawing. Filed Oct. 30, 1959, Ser. No. 849,751
5 Claims. (Cl. 260—650)

This invention relates to a novel class of substituted aromatic compounds, the 1-aryl-2,2-dihalocyclopropanes and 1-aryl-1-methyl-2,2-dihalocyclopropanes and especially pertains to 1-aryl and 1-aryl-1-methyl-2,2-dichloro- and 2,2-dibromo-cyclopropanes and a process for preparing them.

The novel class of substituted aromatics to which this invention relates has the following general formula:

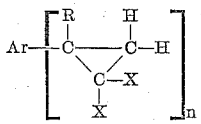

wherein Ar is a mono or divalent aryl radical, R is hydrogen or methyl, X is chlorine or bromine and $n$ is 1 or 2. These compounds are derived from the reaction of a vinyl or alpha-methyl vinyl substituted aromatic compound with a dichlorocarbene or dibromocarbene formed in situ by the alkaline hydrolysis of chloroform or bromoform. These dihalo carbenes are sufficiently stable and/or form sufficiently readily to react with the vinyl group:

or α-methyl vinyl group:

to form the 2,2-dichloro- or 2,2-dibromo-cyclopropyl or 1-methylcyclopropyl group. The reaction is accomplished by combining the aromatic vinyl or α-methylvinyl compound with an alkali metal alkoxide of a lower aliphatic alcohol; i.e., sodium or potassium methoxide, ethoxide, t-butoxide, and the like, and an inert reaction solvent such as a paraffinic hydrocarbon. A small quantity of chloroform or bromoform is added to this mixture. The resulting mixture is heated to its boiling point and there maintained with external heating until the reaction begins. There is a short initiation period of about 10 to 30 minutes during which the addition of heat to maintain reflux conditions is necessary. After the reaction begins, as may be noted by the formation of sodium or potassium chloride or bromide, the external source of heating can be stopped since the reaction is exothermic and the remainder of the chloroform or bromoform added, preferably slowly, to maintain a gentle reflux. To insure good contact between the reactants, the reaction mixture may be stirred. The resulting reaction mixture is permitted to reach ambient or room temperature. Water may be added to dissolve the sodium or potassium chloride or bromide by-product and to permit a separation of the 1-aryl dihalocyclopropane formed which is dissolved in the reaction solvent. The resulting mixture is separated into an organic phase and an aqueous phase as, for example, by settling and decantation. The two liquid phases are separated. The aqueous phase may be extracted with solvent such as the paraffinic hydrocarbon employed as the reaction solvent. The extracts and the organic phase are combined, dried, if desired, and the 1-aryl dihalocyclopropane is recovered, for example, by distillation or by evaporation of the solvent associated therewith. The 1-aryl dihalocyclopropane can be further purified by fractionation when feasible or by extraction or recrystallization when applicable.

The novel compounds of this invention having the formula hereinbefore set forth include compounds whose Ar-groups are not appreciably more acidic than are the aryl hydrocarbon groups such as phenyl, tolyl, ethylphenyl, cumyl, the monobutylphenyls, xylyl, diethylphenyl, diisopropylphenyl, cymyl, naphthyl, methylnaphthyls, ethylnaphthyls, biphenyl, alkylated biphenyls, vinylphenyl, α-methylvinylphenyl, and the like. The Ar-group may contain a single aromatic ring as in the phenyl, alkylated phenyls, phenylene, etc. groups, two or more independent six-membered rings such as in biphenyl, terphenyls, quaterphenyls and alkylated derivatives thereof, or two or more fused aromatic rings as in naphthyl, anthracene, phenanthrene, chrysene, pentacene, and the like. Those containing only one aromatic ring are, of course, derivatives of styrene, α-methylstyrene, divinylbenzene and di-(α-methylvinyl) benzene and their nuclear alkylated derivatives. Those containing two or more aromatic rings, independent or fused, are the vinyl and α-vinyl derivatives of the corresponding aromatic hydrocarbons and their nuclear alkylated derivatives. The latter, the vinyl and α-methylvinyl derivatives of the poly ring aromatics, can be prepared according to the process of U.S. Patent 2,404,235 or according to the process described in the articles in J.A.C.S., 68, 1105–1112. In addition to the ar-nuclear substituted alkyl hydrocarbon groups, there may also be present keto groups as in p-vinyl acetophenone, p-vinyl benzophenone, alkoxy groups as in methoxy styrenes, and the like.

The compounds of this invention are exceptionally useful because of the presence of the 2,2-dichloro- or 2,2-dibromocyclopropyl groups. These groups may be reacted as the same groups attached to an aliphatic chain. The preparation of such compounds from olefins and dichlorocarbene is described in J.A.C.S., 76, 6162 (1954), and J.A.C.S., 80, 5275 (1958). By opening the ring of the 2,2-dichloro- or dibromocyclopropyl group with a strong acid such as $H_2SO_4$, hydrobromic, glacial acetic, and the like, in a manner known to the art, there is formed a three-carbon aliphatic group which may be unsaturated or which may contain the elements of the acid used to open the ring. Also, the ar-alkyl 1-aryl-2,2-dichloro- or dibromo-cyclopropanes can be oxidized to the corresponding aromatic mono, di and higher polycarboxylic acids without destroying the cyclopropane groups. These unique acids and their preparation are more fully described in our copending application Serial No. 849,752, filed October 30, 1959, and now abandoned.

In order to facilitate a clear understanding of the invention, the process for preparing the novel substituted aromatic compounds is illustrated by the following detailed description.

*Example 1*

1-(p-tolyl)-2,2-dichlorocyclopropane is prepared in the following manner. A three liter, 3-neck flask equipped with a stirrer, condenser and dropping funnel is charged with 3 moles (162 grams) sodium methoxide, 500 milliliters pentane as the reaction solvent, and 2.77 moles (354 grams) p-methylstyrene. Three moles (360 grams) of chloroform are added to the dropping funnel and 30 milliliters of chloroform are added to the flask. The mixture in the flask is heated to its boiling point and maintained under reflux conditions until the reaction is initiated. The heat source s removed and chloroform is added dropwise at a rate to maintain a gentle reflux, about three hours. After the addition of chloroform is complete, the resulting mixture is stirred at room temperature overnight. To the resulting mixture there are added 800 milliliters of water. The mixture is permitted to separate into two phases. The water phase is extracted with pentane. The pentane extracts and the organic layer are combined and dried over anhydrous magnesium sulfate. The dried material is distilled to recover p-methyl-1-(2,2-dichlorocyclopropyl) benzene with boiling point 122° C. at 12 mm. Hg and refractive index $n_D^{20}$ 1.5460. By analysis of this compound the carbon, hydrogen and chlorine content was determined and found to be in close agreement with the corresponding values calculated for $C_{10}H_{10}Cl_2$ as the following indicates:

COMPOSITION

|  | By analysis, percent | Calculated, percent |
|---|---|---|
| Carbon | 60.3 | 59.7 |
| Hydrogen | 5.28 | 4.98 |
| Chlorine | 35.2 | 35.3 |

*Example 2*

By repeating the process of Example 1 employing 284 grams styrene in place of 354 grams p-methylstyrene, there was obtained by the distillation of the dried pentane solution 1-phenyl-2,2-dichlorocyclopropane with boiling point 103° C. at 10 mm. Hg and refractive index $n_D^{20}$ 1.5508. By analysis of this compound the chlorine content was determined and found to be in close agreement with the corresponding values calculated for $C_9H_8Cl_2$ as the following indicates:

COMPOSITION

|  | By analysis, percent | Calculated, percent |
|---|---|---|
| Chlorine | 37.9 | 38.0 |

*Example 3*

The process of Example 1 is repeated except that 354 grams (2.77 moles) mixed meta and para vinyl toluenes, 60% meta and 40% para, are employed in place of p-methylstyrene. The dried combined pentane extracts and organic layer are distilled to remove the pentane. The residue is distilled at 10 mm. Hg. There are collected 86.6 grams of a fraction boiling in the range of 114–117° C. This material is fractionated through an Oldershaw column and a center cut boiling at 115°–116° C. at 10 mm. Hg is taken. This center cut has a refractive index $n_D^{20}$ 1.5458. By analysis of this center cut the carbon, hydrogen and chlorine content was determined and found to be in close agreement with the corresponding calculated values for $C_{10}H_{10}Cl_2$ as the following indicates:

COMPOSITION

|  | By analysis, percent | Calculated, percent |
|---|---|---|
| Carbon | 60.1 | 59.7 |
| Hydrogen | 5.29 | 4.98 |
| Chlorine | 35.3 | 35.3 |

By oxidation of the center cut it is found that the product of this process contains 1-(m-tolyl)-2,2-dichlorocyclopropane (60%) and 1-(p-tolyl)-2,2-dichlorocyclopropane (40%).

*Example 4*

By repeating the process of Example 1 employing 354 grams of α-methylstyrene in place of p-methylstyrene, there was obtained 1-methyl-1-phenyl-2,2-dichlorocyclopropane with boiling point 92° C. at 6 mm. Hg and refractive index $n_D^{20}$ 1.5400. By analysis of this compound the carbon, hydrogen and chlorine content was determined and found to be in close agreement with the corresponding calculated values for $C_{10}H_{10}Cl_2$ as the following indicates:

COMPOSITION

|  | By analysis, percent | Calculated, percent |
|---|---|---|
| Carbon | 58.7 | 59.7 |
| Hydrogen | 5.26 | 4.98 |
| Chlorine | 35.3 | 35.3 |

*Example 5*

By repeating the process of Example 1 employing 480 grams of p-isopropyl-α-methylstyrene in place of 354 grams p-methylstyrene, there was obtained 1-methyl-1-p-cumyl-2,2-dichlorocyclopropane with boiling point 133° C. at 9 mm. Hg and refractive index $n_D^{20}$ 1.5291. By analysis of this compound the carbon, hydrogen and chlorine content was determined and found to be in close agreement with the corresponding calculated values for $C_{13}H_{16}Cl_2$ as the following indicates:

COMPOSITION

|  | By analysis, percent | Calculated, percent |
|---|---|---|
| Carbon | 63.6 | 63.9 |
| Hydrogen | 7.12 | 6.97 |
| Chlorine | 29.1 | 29.1 |

*Example 6*

By repeating the process of Example 1 employing 480 grams m-isopropyl-α-methylstyrene instead of 354 grams p-methylstyrene, there was obtained 1-methyl-1-m-cumyl-2,2-dichlorocyclopropane with boiling point 135° C. at 11 mm. Hg and refractive index $n_D^{20}$ 1.5249.

*Example 7*

The compound p-bis (2,2-dichlorocyclopropyl) benzene having the formula:

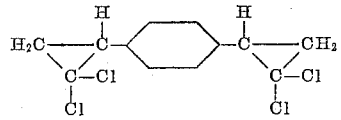

may be prepared by stirring and heating a mixture of 130 grams (1.0 mole) divinyl benzene, 230 grams (2.05 moles) potassium tert. butoxide, 50 grams chloroform and 800 grams heptane to its boiling point and maintained under reflux conditions until the reaction is initiated. Thereafter, external heating is stopped and 265 grams (2.1 moles) of chloroform are slowly added to maintain a gentle reflux. After completion of the chloroform addition, the reaction mixture is stirred until its temperature cools to 25° C. Water is added to the mixture to dissolve the solids formed. The aqueous layer and organic layer are separated. The aqueous layer is extracted with heptane. The extracts and organic layer are combined, dried and distilled to remove heptane. The residue may be purified by fractionation.

*Example 8*

By the procedure of Example 1 or 7, there may be prepared 4-(2,2-dichlorocyclopropyl) biphenyl:

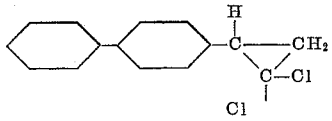

by reacting 4-vinyl biphenyl with chloroform in the presence of an alkali metal alkoxide such as sodium ethoxide.

*Example 9*

By the procedure of either of Examples 1 or 7, there may be prepared 1-(m-sec. butylphenyl)-2,2-dichlorocyclopropane:

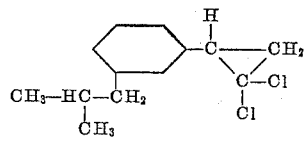

by reacting m-sec. butyl styrene with chloroform in the presence of potassium isopropoxide.

TABLE I
*1-(Substituted Aryl)-2,2-Dihalocyclopropanes*

| Ex. No. | Reactants | | Product structural formula and name |
|---|---|---|---|
| | Vinyl Aromatic | Dihalo-Carbene Precursor | |
| 10 | 4-tert. butyl-2,6-dimethylstyrene | $CHCl_3$ | 1-(2,2-dichlorocyclopropyl)-4-ter.butyl-2,6-dimethylbenzene. |
| 11 | m,α-Dimethylstyrene | $CHBr_3$ | 1-(1-methyl-2,2-dibromocyclopropyl)-m-toluene |
| 12 | 2,4-dimethylstyrene | $CHCl_3$ | 1-(2,2-dichlorocyclopropyl)-2,4-dimethylbenzene |
| 13 | 3,5-dimethylstyrene | $CHCl_3$ | 1-(2,2-dichlorocyclopropyl)-3,5-dimethylbenzene |
| 14 | 2,4,6-trimethylstyrene | $CHCl_3$ | 1-(2,2-dichlorocyclopropyl)-2,4,6-trimethylbenzene |
| 15 | p-Ethylstyrene | $CHBr_3$ | 1-(2,2-dibromocyclopropyl)-4-ethylbenzene |
| 16 | p-Isopropyl-α-methylstyrene | $CHBr_3$ | 1-(1-methyl-2,2-dibromocyclopropyl)-4-isopropylbenzene |
| 17 | 1-vinyl acenaphthene | $CHCl_3$ | 1-(2,2-dichlorocyclopropyl)acenaphthene |

| Ex. No. | Reactants | | Product structural formula and name |
|---|---|---|---|
| | Vinyl Aromatic | Dihalo-Carbene Precursor | |
| 18 | 1-vinyl naphthalene | CHBr₃ | 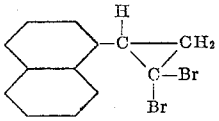 1-(2,2-dibromocyclopropyl)naphthalene |

We claim:

1. An aromatic dihalocyclopropane having the formula:

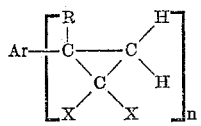

wherein Ar is an aromatic hydrocarbon radical whose valence corresponds to the value of $n$ selected from the class consisting of alkyl substituted phenyl radicals, the divalent phenylene radical, aromatic hydrocarbon radicals containing more than one independent joined 6-membered aromatic ring, aromatic hydrocarbons containing fused rings, and alkyl hydrocarbon derivatives of these multi-ring aromatics, R is a member selected from the class consisting of hydrogen and an alkyl hydrocarbon radical, X is a halogen selected from the class consisting of chlorine and bromine and $n$ is an integer from 1 to 2.

2. 1-(p-Biphenyl)-2,2-dichlorocyclopropane having the formula:

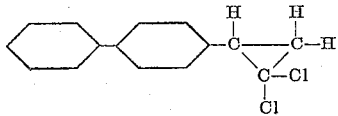

3. A 1-tolyl-2,2-dichlorocyclopropane having the formula:

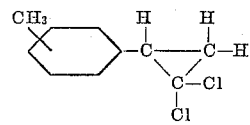

4. A 1-xylyl-2,2-dichlorocyclopropane having the formula:

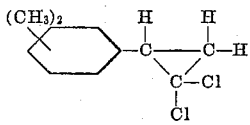

5. p-Di-(2,2-dichlorocyclopropyl) benzene having the formula:

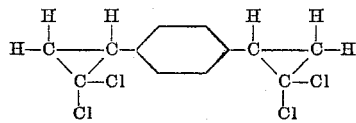

References Cited in the file of this patent

Skell et al.: J. Am. Chem. Soc. 78, 5430–3, 1956.